Oct. 29, 1935.  V. A. BOKER  2,018,831
METAL SAWING AND FILING MACHINE
Filed March 20, 1933   4 Sheets-Sheet 1

Inventor
Vitus A. Boker
By his Attorneys
Michael Hilgar

Oct. 29, 1935.  V. A. BOKER  2,018,831
METAL SAWING AND FILING MACHINE
Filed March 20, 1933    4 Sheets-Sheet 2

Inventor
Vitus A. Boker
By his Attorneys

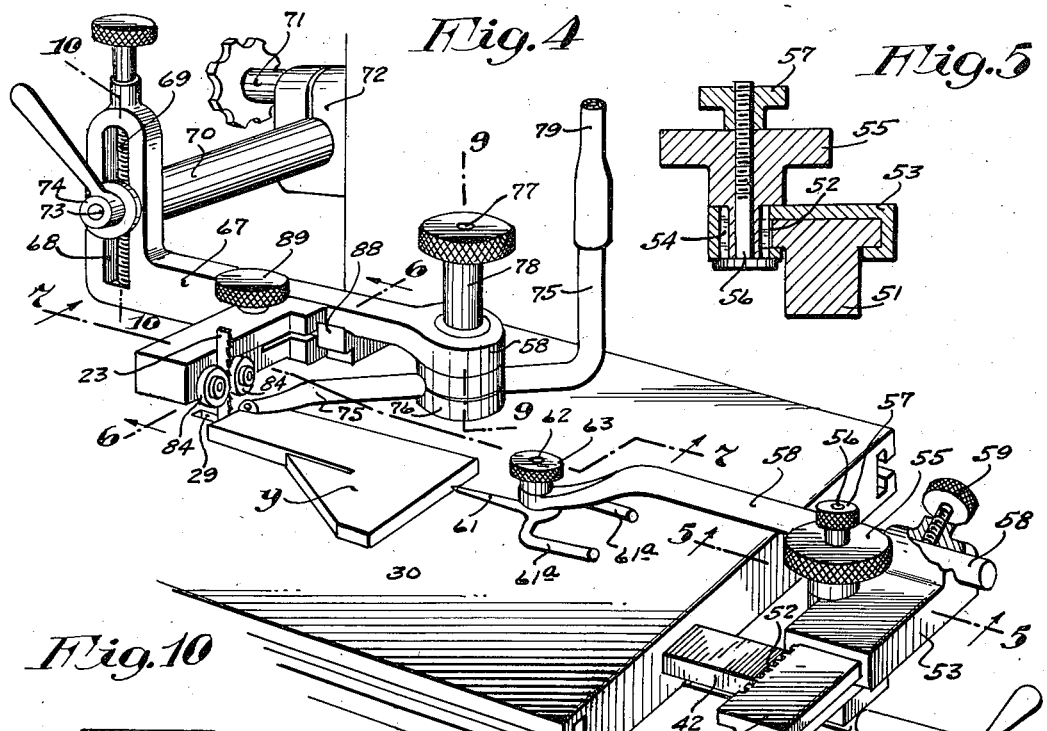

Oct. 29, 1935.   V. A. BOKER   2,018,831
METAL SAWING AND FILING MACHINE
Filed March 20, 1933   4 Sheets-Sheet 4
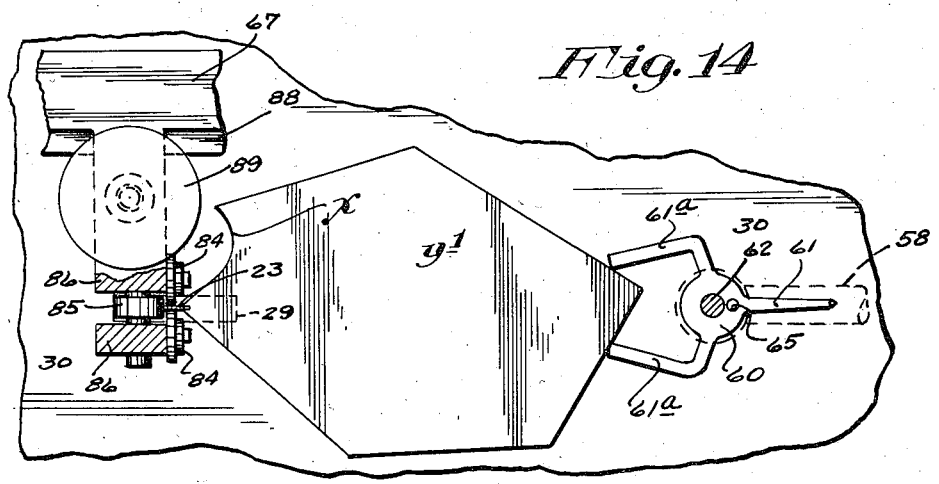
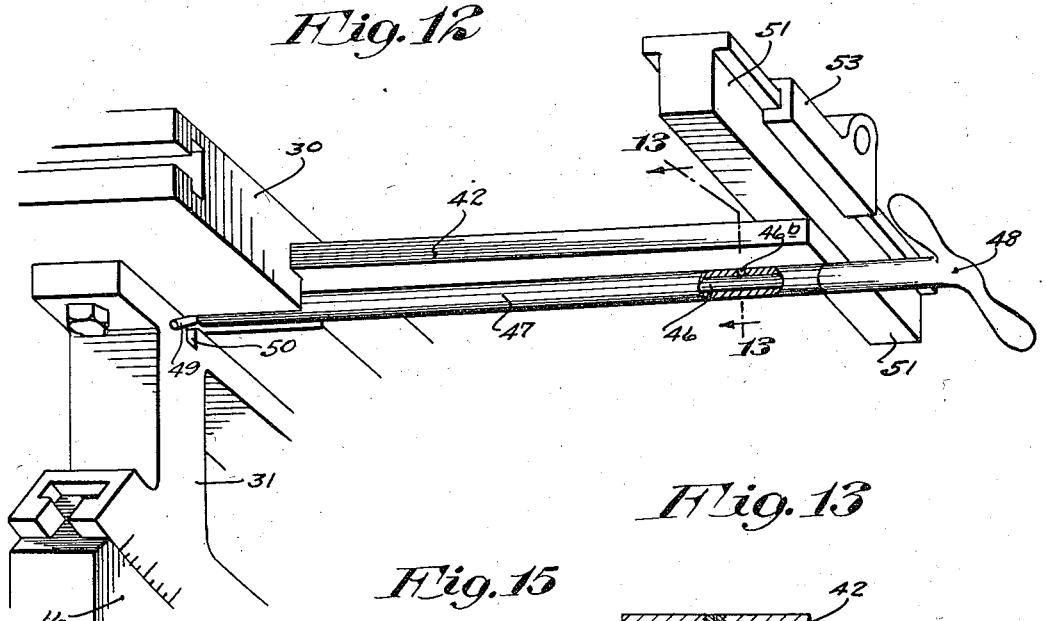
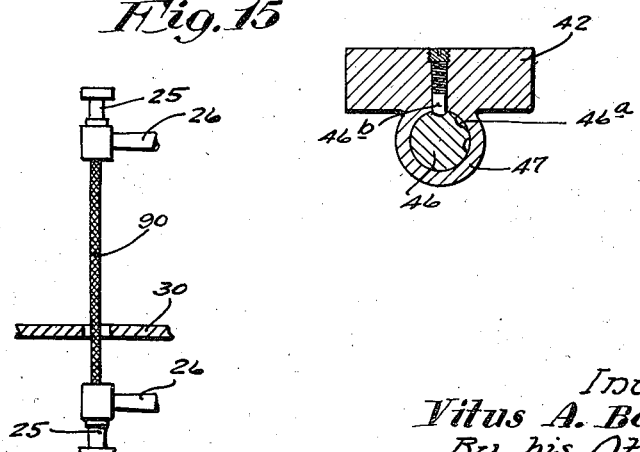
Inventor
Vitus A. Boker
By his Attorneys Patented Oct. 29, 1935

2,018,831

UNITED STATES PATENT OFFICE 2,018,831

METAL SAWING AND FILING MACHINE

Vitus A. Boker, Minneapolis, Minn.

Application March 20, 1933, Serial No. 661,649

11 Claims. (Cl. 29—74)

My present invention relates to metal cutting machines such as sawing and filing machines, and generally stated, consists of the novel devices, combinations of devices and arrangement of parts hereinafter described and defined in the claims. The machine here illustrated in the drawings has been especially designed for use in the making and roughing out of metallic dies, and various other metal articles which require the use of a saw, a file or other metal cutting tool. The machine also will be found useful in doing, advantageously and quickly, much of the work now done on small shapers or similar machines. In some respects the present machine is in the nature of a modification or further extension of the machine disclosed and claimed in my prior Patent No. 1,412,915, of date August 18, 1922, entitled "Automatic filing machine".

My improved machine involves various novel devices which much increase the range of work capable of being done thereon over the machine of my prior patent, and which increases its efficiency for doing high-grade metallic die work and the like, and the following descriptions whereof will be sufficiently suggestive to enable those skilled in the art to use the same for the above noted or other analogous purposes.

In the accompanying drawings, which illustrate the invention, like characters indicate like parts throughout the several views.

Referring to the drawings:

Fig. 4 is a perspective with some parts broken away or removed showing the worktable and certain associated parts;

Fig. 5 is a section taken on the line 5—5 of Fig. 4;

Fig. 6 is a section taken on the line 6—6 of Fig. 4;

Fig. 7 is a fragmentary section taken in section on the lines 7—7 of Figs. 4 and 6;

Fig. 8 is a bottom plan view showing in detail a part of an arm just above the line 8—8 of Fig. 7;

Fig. 9 is a section taken on the line 9—9 of Fig. 4;

Fig. 10 is a section taken on the line 10—10 of Fig. 4;

Fig. 11 is a view partly in elevation and partly in section on the line 11—11 of Fig. 10;

Fig. 12 is a fragmentary perspective with some parts removed, showing particularly the connection of the feed bar or slide in respect to the worktable;

Fig. 13 is a section on the line 13—13 of Fig. 12;

Fig. 14 is a fragmentary view partly in plan and partly in horizontal section showing a portion of the worktable and associated parts, and illustrating a modified action of the feed device on a peculiarly formed piece of work or sheet metal being sawed or cut; and Fig. 15 illustrates the manner of connecting a file as a metal cutting tool to the tool-carrying devices.

Figure 1:
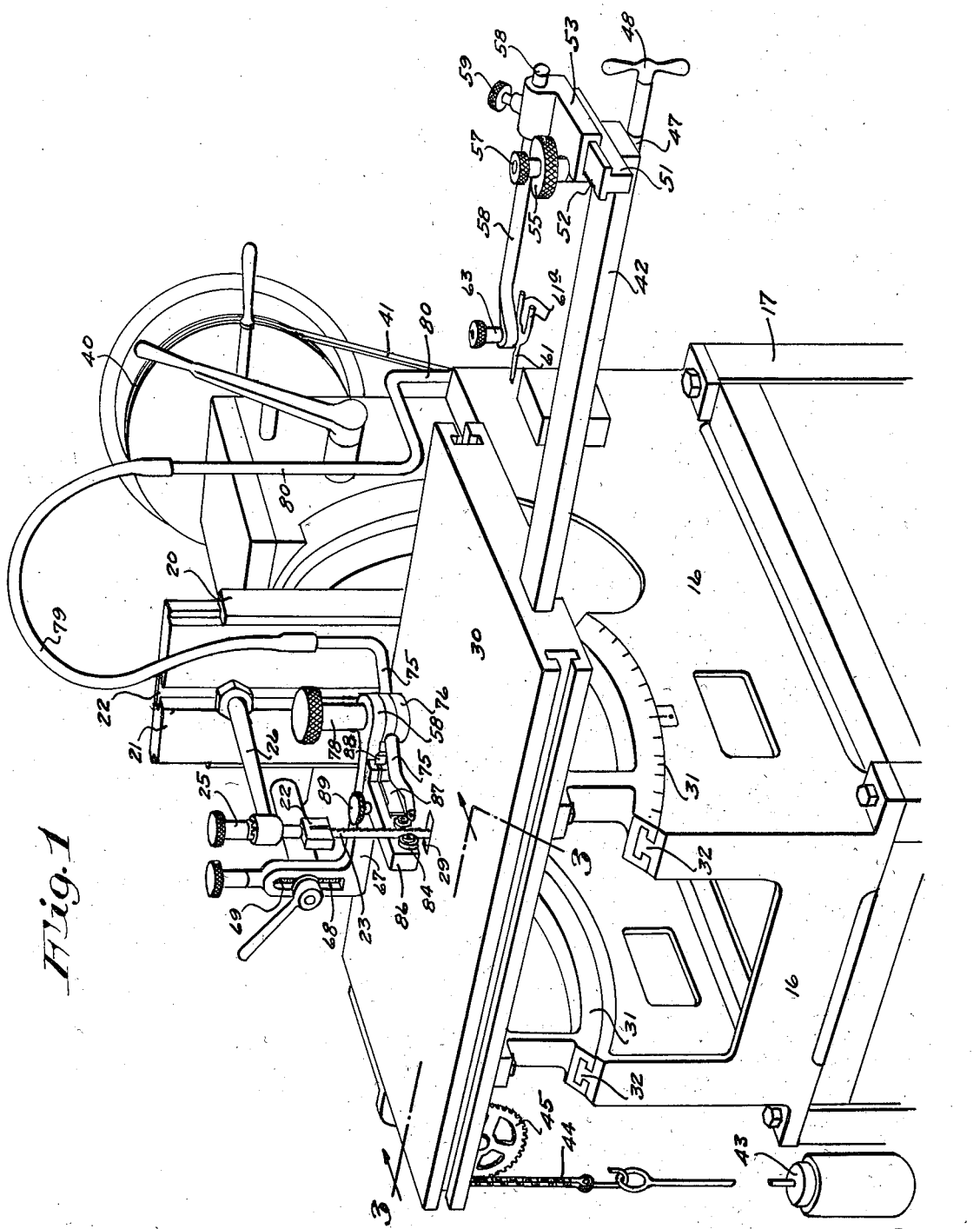
Fig. 1 is a perspective showing the improved machine, in the present instance equipped with a saw as the metal cutting tool.

The bed or body portion of the machine is in the form of a casting 16 shown as supported by legs 17 and provided at its rear with a raised gear housing 18.

Rigidly secured to the front face of the gear housing 18 by a sort of crank case housing 19 is an upright crosshead guide 20. Mounted for vertical sliding movements in the dovetailed or similar channel formed in the face of guide 20, is a vertically movable crosshead or tool-carrying slide 21, which in its face, is formed with a dovetailed channel 22, see particularly Figs. 1 and 2.

In the first instance, I have illustrated the use of a saw as the metal cutting tool. This saw 23 at its upper and lower ends, is held in the jaws 24 of adjusting screws 25, which, in turn, are mounted for vertical movements in upper and lower tool-carrying arms 26. These tool-carrying arms 26 have inner end heads 27 that work in the dovetailed groove 22 of crosshead 21 and are rigidly clamped to said crosshead in the proper vertical adjustments by nuts 28.

The saw 23 in the present instance (or the file in the other instance) is arranged to work through the small tool passage 29 formed in the central portion of a worktable 30; and obviously, in this arrangement, one of the arms 26 and tool-carrying equipment will be below said table. The worktable 30 is provided with depending bearing segments 31, which, by dove-tailed engagements 32, are connected to flanges of the base 16 for angular adjustments of the worktable. Here it is important to note that the arcs of the segments 31 are that of a circle whose center is on a line drawn longitudinally of the worktable 30 through the tool passage 29 thereof. Such arrangement provides for angular adjustments of the worktable without shifting the passage 29 laterally in respect to the saw or cutting tool.

On the back of the crosshead 21 is a raised pin 33 that works through a long slot in the back of the crosshead guide 20 and, within the housing 19, is connected to the upper end of a short crank rod 34, carried by the crank pin of a crank 35 (shown as in the form of a disc), secured to the front end of a countershaft 36 journaled in suitable bearings, preferably anti-friction bearings, provided in the front and rear walls of the gear housing 18. By suitable reduction gears, shaft 36 is connected to driving shaft 37, the projecting end of which is driven from an electric motor 38 shown as mounted within the rear portion of the base casting 16, see particularly Fig. 2. The driving connections between the motor and said shaft 37 and, in fact, between any source of power and the crank 35, may take various forms, but as shown, involves pulleys 39 on the motor shaft, pulleys 40 on said shaft 37, and a suitable driving belt 41, which latter is shown only in Fig. 1.

For feeding the work to or against the saw, file or other cutting tool, a novel and preferably automatic feed mechanism is provided. This mechanism, as shown, comprises a feed bar 42 mounted to slide through a suitable seat formed in the under side of the table 30. This feed bar 42 is located at one side of the tool passage 29 and its line of feed movement is parallel to the cutting plane of the saw 23. For putting the feed bar 42 under yielding strain to move in a direction to feed the work toward the saw or cutting tool, a weight 43 is preferably employed; and this weight, as shown, is attached to the lower end of a flexible ribbon in the form of a sprocket chain 44 arranged to run over a guide in the form of a sprocket wheel 45 that is suitably journaled to the under side of the table 30. To lock said bar 42 in a withdrawn position when desired, a stop rod 46 is provided. This rod is shown as extended through and mounted for oscillatory movements but is held against endwise movements in a guide tube 47 that is rigidly secured to the bottom of said feed bar. At its outer end, rod 46 is shown as provided with a hand grip or head 48 and at its inner end with a radially projecting lug 49 adapted to be turned into and out of registration with a groove 50 formed in the top of the front table-supporting segment 31. Obviously, when lug 49 is turned into registration with groove 50, weight 43 will become effective to move bar 42 toward the saw or cutting tool; but when said lug 49 is turned against the adjacent segment 31, as shown in Fig. 12, bar 42 will be locked in its outermost position and against inward movement. This locking of the feed bar is desirable especially when work is being arranged on the worktable. To yieldingly hold rod 46 against accidental rotation, said rod is shown as provided with shallow indentations 46ª that are engaged by the rounded end of a small spring-pressed plunger 46ᵇ mounted in the bar 42.

Rigidly secured on the outer end of bar 42 is a short transversely extended guide rail 51, one flanged edge of which is provided with teeth 52 that afford a rack fixed to said bar 42. A guide head 53 is mounted to slide on the flanged top of guide rail 51. The rack teeth of guide rail 51 are engaged by a small pinion 54, see particularly Fig. 5, mounted in a laterally projected portion of guide head 53. This pinion 54 is formed as the reduced lower end of a knurled knob 55. Obviously, by rotation of knob 55, guide head 53 may be caused to travel on rail 51. For locking pinion to head 53, when desired, a bolt 56 is passed axially through pinion 54 and knob 55 with its lower end head frictionally engageable with the bottom of head 53 and with its threaded upper end projecting and provided with a knob 57 that acts as a clamping nut, which, when tightened, clamps knob 55 tightly on the top of head 53 and locks pinon 54 against rotation.

Figure 2:
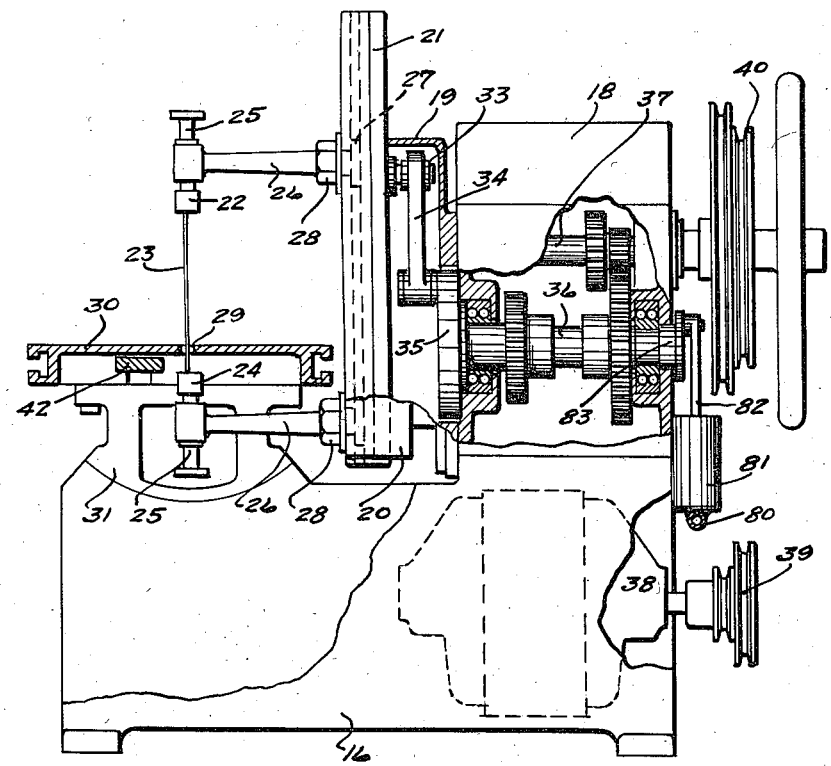
Fig. 2 is a view in side elevation with some parts in section showing the machine.
Figure 3:
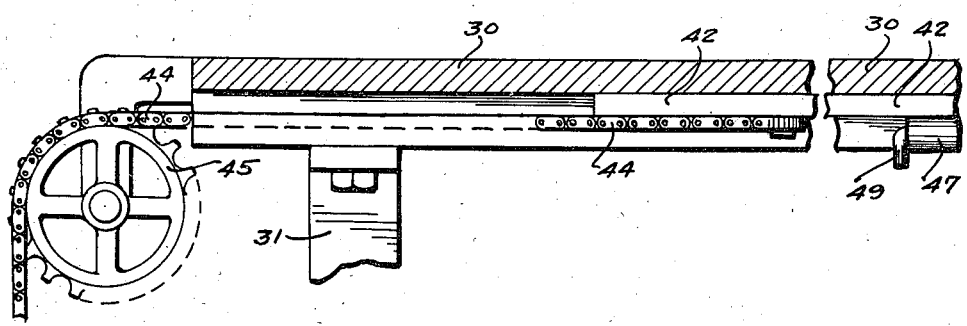
Fig. 3 is a fragmentary view in section on the line 3—3 of Fig. 1.

A guide arm 58, see Figs. 1, 4 and 7, that is mounted in one end portion of guide head 53, is normally held both against rotation and axial adjustments by a set screw 59. The main body portion of this arm 58 extends approximately parallel to bar 42 and to the forwardly projecting end thereof is attached a work-engaging hand 60 which preferably and as shown is provided with an individual work-engaging finger 61 and with a pair of spaced work-engaging fingers 61ª. This so-called hand is provided with a threaded stem 62 that is extended through the front end of guide arm 58 and provided with a cap nut 63, within which, as shown, is seated a small compressed coil spring 64. On its upper face, hand 60 is shown as provided with a small conical boss 65 that is engageable with either one of diametrically spaced depressions 66 formed in the under surface of the front end portion of guide arm 58.

When nut 63 is loosened slightly, the fingered work-engaging hand may be rotated so as to present either the individual finger 61 or the spaced fingers 61ª for contact with the work.

In Figs. 4 and 7, sharp point of finger 61 is shown as engaged with one edge of a piece of work in the form of a flat piece of steel or other metal indicated by the character y.

As an important feature of the invention, there is provided a blower for blowing the metallic sawdust or the filings in the other instance, from the work, or particularly from that portion of the work that is being acted upon by the cutting tool. This blower, as a further novel feature, includes an air delivery tube arranged to act as a work-hold-down device, preventing the piece of work being sawed or filed from being lifted from the worktable. For supporting this combined air delivery tube and hold-down device and for supporting a saw-guiding device, when the saw is employed as the cutting tool, there is provided a mounting bracket or member 67. This bracket as shown, is approximately L-shaped with a short vertical arm portion at one end thereof formed with a vertical slot 68 and provided with a vertically disposed adjusting screw 69 mounted for rotary, but held against vertical movements in said bracket, see Figs. 1, 4, 10 and 11. The screw 69 is extended through and has threaded engagement with the projecting end of a heavy stud or arm 70, which, as shown, is rigidly clamped by a screw 71 or the like, between jaws of a vise or split clamping head 72, which latter is rigidly secured to the gear housing 18. The projected end of stud 70 is shown as provided with a threaded trunnion 73 on which works a handle-equipped nut 74, which, when tightened, locks the brackets 67 to stud 70 against vertical adjustments, which adjustments, however, can be readily made by screw 69 when said nut 74 is loosened.

The air delivery tube which also acts as a work-hold-down device is indicated by the numeral 75. Horizontal portion of this tube 75, see particularly Figs. 4, 6, 7 and 9, is passed through the head 76 of a clamping bolt 77, the threaded stem of which is passed upward through the front end of arm 58 and is provided with a nut 78 which when tightened, clamps the tube 75 against both axial and rotary movements.

Air tube 75 is connected by suitable means such as a small rubber hose 79 and pipe 80 to the air delivery end of cylinder 81, of an air pump, the piston of which is connected by a crank rod 82 to the wrist pin of a crank 83, shown as carried by the end of the countershaft 36. The air pump just noted may be of any suitable type such as will deliver pulsating discharges of air.

When a saw is used, it requires a saw guide located close to the point where the saw acts upon the work. The saw guide illustrated comprises laterally spaced rolls 84 and a rear guide roll 85 located a short distance above the work, and journaled to a bearing block or bracket extension 86, as best shown in Figs. 4, 6 and 7. This block 86, at its inner end is split or divided to form a clamp 87, which and the inner edge of the block, are formed with a dove-tailed rib 88 formed on the mounting bracket 67. By a clamping screw 89 which works loosely through the block 86 and has threaded engagement with the clamp 87, said block may be rigidly secured in any desired or set position.

In Fig. 14, the work-guiding hand 60 is shown as reversed so that its fingers 61a will engage, on opposite sides of a projecting point, the edges of a piece of work in the form of a metal plate $y^1$.

In Fig. 15, a file 90 is shown as substituted for the saw and secured at its upper and lower ends to the socket-like outer ends of the tool-carrying arms 26, from which arms the jaws 24 and screws 25 have been removed. Also when the file is substituted for the saw, the block 86 with its rollers 84 and 85, will be removed from bracket 67.

*Operation*

When a piece of work, such as a metal plate, is to be sawed, it will of course be placed on the worktable and against the saw and the air delivery point of tube 75 will be adjusted so that it will loosely engage or closely overlie the upper surface of the plate and will thereby prevent the work from being raised under the upward movements of the saw. Also when the machine is in action, the pump will cause intermittent discharge of blasts of air against that portion of the saw that is acting upon the work or metal plate, and thus the metal sawdust will be blown away from and clear of the work and of the saw. The mounting bracket 67 is capable of being given vertical adjustments by the screw 69 when nut 74 is loosened and to be locked against such adjustment when said nut is tightened. The block 86 is capable of being longitudinally adjusted so as to bring the rollers 85 and 86 in proper engagement with the sides and the back edge of the saw. The delivery end of the tube 75 is laterally offset from the longitudinal axis of said tube and in respect to the pivotal connection between said tube and clamping head 76. In view of this arrangement, the extreme delivery end of said tube will be raised when said tube is slightly rotated on its axis in a clockwise direction with respect to Figs. 1 and 4, and will be lowered by slight rotation in a counterclockwise direction.

Here it may be stated that for die-work and certain other purposes, it is often desirable to set the machine to cut or saw into the metal plate or work element at an angle, sometimes, as much or even more than five degrees, to provide for required "draw" in the dies.

When the finger or fingers of the work-engaging hand 60 are engaged with the work, such as the plate $y$ shown in Fig. 5, or the plate $y^1$ shown in Fig. 14, and the guide head 53 is set in its fixed position in respect to the feed bar 42, when the latter is subject to the weight 43, the work will be fed to the saw for cutting the same on a straight line. The work, however, can be cut on a curved line simply by shifting the guide head 53 in the one direction and the other for manipulation of the knob 55, while the latter is released from the lock nut 57. Thus not only straight line cuts at various angles may be made, but curved cuts such as indicated at $x$ on the plate $y^1$ of Fig. 14 may be cut with the saw. In cutting on curved lines, a hand manipulation control will be required, but in cutting on straight lines, the machine may be set into action and the cutting will be automatically controlled.

When a file is used as the cutting tool, the work will be held pressed against the file by the action of the weight, in which event there will be little or no perceptible movement of the work or of the feed bar 42. From the foregoing, it is evident that in the particular structure illustrated, the weight 43 and its connections to the feed bar 42 afford a primary feed means for moving the feed device on a straight line toward the saw or cutting tool; and that the transversely movable head 53 and its operating connections constitute a manually-operated secondary feed means that is operative, at will, to modify the primary feed action by shifting the work transversely of the direct line of feed while the primary feed means is in action.

What I claim is:

1. In a machine of the kind described, a worktable having a tool passage therein, a cutting tool, means for reciprocating a tool through said tool passage, a feed bar mounted in said table and under yielding strain to move toward said tool, a guide head secured to the outer end of said feed bar for adjustments transversely thereof, and a guide arm carried by said guide head and provided with a work-engaging element that is adjustable therewith transversely of the line of the feed of the work to the tool.

2. The structure defined in claim 1 in which said tool is a saw and said work-engaging element is a work-engaging finger.

3. The structure defined in claim 1 in further combination with a stop device carried by said feed bar and movable to a position to lock the same in a retracted position.

4. The structure defined in claim 1 in further combination with means for locking said guide head against transverse movements in respect to said feed bar.

5. The structure defined in claim 1 in which said feed bar at its outer end has a rack-toothed element on which said guide head is mounted to slide, and in further combination with a rotary adjusting device mounted on said head and having a pinion engageable with the rack toothed element.

6. In a machine of the kind described, a worktable, means including a tool carrier for reciprocating a cutting tool in respect to the face of said table, and means for feeding work toward the cutting tool carried by said tool carrier, including a work-engaging element for direct engagement with the work and which work-engaging element is reversible and is provided with a single finger projecting in one direction and a pair of co-operating spaced fingers projecting in the opposite direction.

7. In a machine of the kind described, a work-supporting table having a flat face on which the work is adapted to be supported for free longitudinal and transverse sliding movements, a cutting tool working through the plane of said table, a feed device having a push-acting work-engaging element, primary means operative on said feed device normally to feed the work to said cutting tool, on a straight line, and manually-operated secondary means operative, at will, to modify the primary feed action by shifting the work transversely of the direct line of feed, while said primary feed means is in action.

8. In a machine of the kind described, a work supporting table having a flat face on which the work is adapted to be supported for free longitudinal and transverse sliding movements, a cutting tool working through the plane of said table, a feed device comprising a plurality of parts, one of which is movable toward and from the tool on a straight line, and the other of which is movable with the first named part but is manually adjustable transversely of said plane to thereby modify the straight line feed action by shifting the work transversely of the direct line of feed while the first noted element is being moved toward the cutting tool on a straight line.

9. The structure defined in claim 7 in which said primary feed means operates automatically to produce the general feed movement toward the cutting tool.

10. The structure defined in claim 8 in which said primary feed means operates automatically to produce the general feed movement toward the cutting tool.

11. In a machine of the kind described, a work table with a tool passage therein, means for working a cutting tool through said tool passage, and a feed device comprising a plurality of parts, one of which is movable toward and from the tool on a straight line parallel to the cutting plane of said tool, and another of which is movable with said first named part but is manually adjustable transversely of said cutting plane, said second named part having a push-acting work engaging element, said work-engaging element being reversible and provided with a single finger projecting in one direction and with a pair of co-operating spaced fingers projecting in the opposite direction.

VITUS A. BOKER.